Oct. 25, 1932.  J. T. LIGGETT  1,884,005
TRACTOR
Filed May 29, 1929
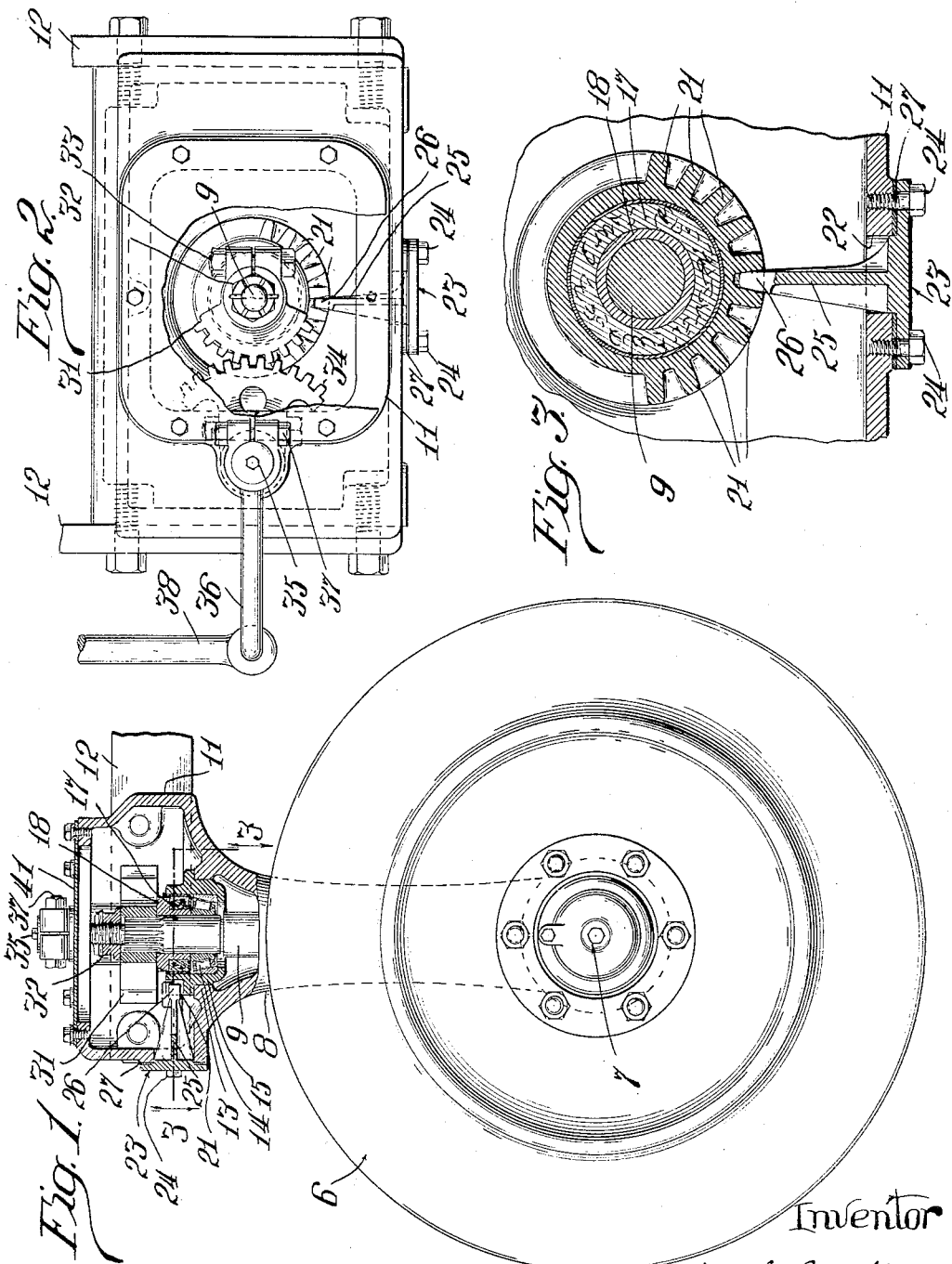

UNITED STATES PATENT OFFICE

JOHN T. LIGGETT, OF WATERLOO, IOWA, ASSIGNOR TO JOHN DEERE TRACTOR COMPANY, OF WATERLOO, IOWA, A CORPORATION OF IOWA

TRACTOR

Application filed May 29, 1929. Serial No. 366,913.

This invention relates to improvements in tractors.

Tricycle tractors equipped with a single front wheel and two rear wheels are being used extensively in farm work. In tractors of this kind, the front wheel is usually the steering wheel, and the rear wheels the driving wheels. These tractors are particularly advantageous for use as a source of motive power for propelling planters, cultivators and the like through a field.

Usually when a cultivator is attached to a tractor of this kind it is attached to the front end of the tractor adjacent to or immediately in front of the single steering wheel.

With the steering wheel traveling between two rows of plants and the driving wheels traveling on the outside of those two rows of plants, the tractor can efficiently drive a cultivator that will cultivate two or more rows of plants at one time.

In an arrangement of this kind, it is very necessary that the tractor respond very quickly and accurately to a movement of its steering mechanism so that it may be accurately controlled and the shovels of the cultivator mounted on it moved to dodge the plants that are being cultivated.

In one form of tractor of this kind the frame work of the tractor is attached to opposite sides of a gear box disposed at the front end of the machine. This gear box is at the upper end of the front spindle which supports the front wheel and forms a casing or housing for the steering shaft that controls the movement of this wheel. The front wheel of such a tractor is in reality two wheels spaced so close together that they are in effect a single wheel and may be treated as such.

Within the gear box is mounted a gear segment which is keyed to the upper end of the steering shaft, and a gear sector which cooperates therewith to rotate the shaft and steer the tractor.

The sector is mounted on a second or auxiliary shaft disposed substantially parallel to the steering shaft, and is actuated by a lever leading back to the steering mechanism of the tractor.

This arrangement together with a suitable steering mechanism quickly transmits a movement of the steering mechanism to the steering shaft to cause the tractor to be turned. However, if there is any wearing away of the teeth of the sector or segment or both, or wear in the bearings supporting the steering shaft or the auxiliary shaft, lost motion develops and the efficiency of the steering apparatus is diminished by this lost motion. Under these conditions it is difficult, if not impossible, to control the tractor with sufficient accuracy to enable the operator to dodge the plants that he is cultivating, with the result that the shovels of the cultivator uproot many of the plants. This is, of course, particularly true if the rows of plants are not straight.

My present invention specifically relates to an improved construction of the steering shaft and spindle housing, a construction which permits adjustment of the steering sector and segment so that they may be maintained in proper adjustment and so that wearing of the parts may be compensated for.

In the preferred embodiment this adjustability is obtained by providing an eccentric mounting for one of the gear elements, so that by rotating this eccentric mounting the gears can be moved into closer mesh. Preferably this eccentric mounting is associated with the steering shaft or spindle and with the segmental gear mounted thereon, whereby turning of this eccentric mounting serves to move the shaft and its gear segment with respect to the steering sector, so that proper adjustment between the sector and segment may be maintained at all times. The bearing mounting when properly adjusted is securely locked in place by a simple locking device, so that the adjustment is permanent and remains set until manually changed.

I have also provided a packing gland disposed above the bearing so that the gear box containing the sector and segment can be maintained full of grease and all leakage of that grease past the bearing is prevented by the packing gland. Obviously, with the sector and segment running in grease the wear on these parts is greatly reduced and their life thereby lengthened.

To acquaint those skilled in the art with my invention I have illustrated a preferred embodiment of it in the accompanying drawing in which:

Figure 1 is a side view of the front wheel of a tractor and its support including the gear box, a part of which is broken away to show the steering mechanism disposed within it;

Figure 2 is a plan view of the gear box with a portion of the cover broken away; and Figure 3 is an enlarged cross sectional view taken along the line 3—3 of Figure 1.

I have not deemed it necessary to show the entire tractor since the invention is only concerned with the front steering wheel thereof and it will be understood from the drawing how this part of the construction is joined to the tractor frame. As previously remarked, this front wheel 6 is in reality two wheels disposed in close proximity to each other and mounted on a common axle, generally indicated at 7, whereby both wheels swing as a unit and function practically as a single wheel but with the advantage of affording a relatively large tread area and a well balanced construction. The axle 7 is swiveled for horizontal rotative movement on the lower end of a stationary spindle casting 8 which extends upwardly between the two wheels.

Steering movement is transmitted to the wheels through a steering spindle or shaft 9 which connects or joins at its lower end with the transverse axle 7 and which extends upwardly through the hollow spindle housing 8, the lower portion of said spindle having suitable bearing support in the lower portion of the housing 8.

Preferably formed as an integral part of the upper end of the spindle housing 8 is a gear box 11 in which the steering segment and sector are housed. This gear box is bolted between the ends of supporting members 12, 12 which are either integral forward extensions of the tractor frame, or are separate plates secured to the tractor frame. Formed integral with the bottom wall of the gear box is an annular ring or shoulder 13 forming a support for a roller bearing 14 in which the upper portion of the steering spindle 9 is journaled.

The roller bearing 14 is mounted in a bearing collar 15, which collar in turn fits into and rests on the bearing support shoulder 13 for turning movement relatively to said shoulder. The roller bearing 14 is eccentrically mounted in the collar 15, i. e., the axis of turning of the collar 15 in the annular supporting shoulder 13 is offset or eccentric with respect to the rotative axis of the spindle 9 in the bearing 14.

This eccentricity provides for adjustment of the position of the upper portion of the spindle 9 relative to the spindle housing 8, as will be presently described.

The bearing support 15 extends upward from the shoulder 13 and forms a support for the packing 17 which is held down on the upper side of the bearing 14 by the flanged washer 18. This packing and washer form a grease tight joint which prevents the grease encased in the gear box 11 from working its way down through the roller bearing 14 and into the spindle housing 8 with consequent loss from the lower end of this housing.

As will best be seen in Figure 3 a plurality of teeth 21 project radially from the bearing support collar 15. An opening 22 is disposed in the forward face of the gear box 11, and a lock member 23 is projected through this opening and held in place by the cap screws 24. This lock member 23 comprises the flanged arm 25 which terminates in the tapering tip 26, the contour of which is shaped to fit between the teeth 21 on the bearing support 15. The flanged arm 25 of this locking member 23 is offset from the center line of the opening 22 a distance equal approximately to one half of the distance between adjacent teeth 21.

By this arrangement the bearing collar 15 can be locked in comparatively small angular adjustments equal to one half of the distance between adjacent teeth by turning the locking member 23 end for end. Suitable gaskets 27 are provided between the locking member 23 and the walls of the gear box 11 to prevent the leakage of the grease contained in the gear box through the opening 22.

The upper end of the steering spindle 9 is splined and the steering segment 31 is fitted on over this splined portion. A nut 32, screwed on to the threaded end of the spindle 9 above the splined portion, serves to hold the segment 31 securely on the shaft and to hold the flanged collar 18 firmly down on the packing gland 17. A cotter pin may be employed to hold the nut 32 in position on the threads.

The steering segment 31 is slotted and provided with ears disposed on the opposite side of the slot, through which ears a bolt 33 is projected and by tightening this bolt the segment 31 is locked on the splined portion of the shaft against rotation with respect to the shaft.

Cooperating with the steering segment 31 is another steering segment 34 which is mounted on an auxiliary shaft 35 which is suitably journaled in the top and bottom walls of the gear box 11.

The gear sector 34 is keyed against rotation on the shaft 35, and if desired this sector may also be slotted and equipped with a through bolt which can be tightened up to lock it on the shaft 35.

The shaft 35 projects upward through the top of the gear box 11, and the steering lever 36 is attached to this projection of the shaft. This lever is provided with a split collar through which a bolt 37 is projected to clamp the lever on the shaft 35.

The outward end of the lever 35 is pivoted to a rod 38 which extends back to the steering mechanism of the tractor. This steering mechanism, which may be any preferred form of steering device, moves the rod 38 forward and backward longitudinally of the tractor. Such movement of the rod 38 rotates the lever 36 and the shaft 35 around the axis of the shaft 35, thereby oscillating the gear sector 34. Through the meshing relation between the two gear sectors 34 and 31 a rotation of the sector 34 produces a similar rotation of the segment 31 and the steering shaft 9 keyed thereto, this rotation of the steering shaft being in the opposite direction from that of the auxiliary shaft 35 and the gear sector 34.

The gear box 11 is closed by the cover 41 which is bolted over a generally rectangular opening in the upper face of the gear box. The interior of the gear box is maintained partly full of a suitable lubricant such as heavy oil or grease, so that the sector and segment are at least partially immersed in this lubricant.

It will readily be seen that as long as the teeth on the sector 34 mesh closely with the teeth on segment 31 any slight movement of the steering rod 38 will be transmitted to the steering shaft 9. However, if there is any play between the teeth of the sector and segment, there will be lost motion and the rod 38 must be moved a greater distance before the movement of the steering shaft 9 is effected.

If the tractor is to be successfully driven between the rows of plants which frequently are not exactly straight, it is necessary that the operator of the tractor have accurate control of it. Lost motion in the steering mechanism of the tractor impairs the efficiency of that control, with the result that the tractor cannot be steered with sufficient accuracy to enable the operator to dodge plants which may be located slightly out of line.

This lost motion or play may be present due to manufacturing or assembling discrepancies, and is almost certain to develop as a result of wear between the gear teeth in use, notwithstanding the most efficient lubrication of these parts.

The eccentric mounting of the bearing 14 in the collar 15 provides a means for adjusting the segment and sector with respect to each other to compensate for this wear of their respective teeth. When it is necessary to make this adjustment, the locking member 23 is removed from the gear box 11 by removal of the screws 24 and a screw driver or other suitable instrument is projected through the opening 22 into engagement with the teeth 21 of the ring 15. The ring 15 can be rotated in the proper direction to move the bearing 14 and consequently the shaft 9 and segment 31 towards the sector 34. The teeth on the sector and segment are standard gear teeth which are slightly tapered so that this lateral movement of the segment with respect to the sector tightens the meshing of these teeth and removes the play between them caused by their wearing away.

After this adjustment has been properly made, the collar 15 is again locked in position by the insertion of the taper point 26 of the locking member 23 into the space between adjacent teeth 21. By turning this locking member 23 end for end it can be brought into proper registration with the teeth 21 and the collar 15 thereby locked in position within a distance equal to one half of the distance between adjacent teeth on the collar.

Thus it will be seen that a rotation of the collar 15 moves the bearing 14 and shaft 9 supported thereby laterally toward or away from the sector 34 to compensate for wear in the teeth of the segment and sector. The amount of this lateral movement is dependent upon the amount of eccentricity of the mounting of the bearing 14 in the collar 15. I have found that it is not necessary to provide a large lateral adjustment of this shaft, and in the preferred embodiment of my invention I have offset the center of the bearing 14 only a small fraction of an inch from the center of the collar 15. This small eccentricity provides sufficient lateral adjustment to compensate for the normal wearing away of the teeth of the steering mechanism. Obviously, if desired, this eccentricity may be increased and a large lateral adjustment thereby made possible.

While I have chosen to illustrate my invention in connection with a preferred embodiment of it, I have done so by way of example only as there are many modifications and adaptations which can be made by one skilled in the art without departing from the scope and teachings of the invention.

Having thus complied with the statutes and shown and described a preferred embodiment of my invention, what I consider new and desire to have protected by Letters Patent is pointed out in the appended claims.

What is claimed is:

1. In a tractor of the class described, a vertically disposed hollow spindle, a gear box formed integral with and disposed at the top of said spindle and having an opening in one of its side walls, a collar formed in the inside face of said spindle at the junction of said box and spindle, a bearing supporting ring in said collar, a bearing eccentrically mounted in said ring, a shaft disposed in said spindle and projecting through said bearing into said gear box, means including teeth on said ring for rotating it to cause said eccentric mounting of the bearing to move the end of the shaft disposed in the gear box laterally in that box, a locking plate having two bolt holes and a pawl projecting from the plate and offset from the half way point between said bolt holes a distance equal to one half the distance between adjacent teeth on said ring, said pawl being projected through the opening in said gear box side wall to engage the teeth on said ring to lock it, and said locking plate being turnable end for end to adjust said ring within a distance equal to one half of the distance between its teeth.

2. The combination with a gear box having an opening in one of its side walls, a bearing in said box, a rotatable shaft projecting through said bearing into said gear box, of a bearing supporting ring mounted in the box and having an eccentric opening for receiving the bearing, means including teeth on said ring for rotating it to cause said eccentric opening to move the shaft through the medium of the bearing laterally in the gear box, a locking plate having two bolt holes and a pawl projecting from the plate and offset from the half-way point between said bolt holes a distance equal to one-half the distance between adjacent teeth on said ring, said pawl being projected through the opening in said gear box side wall to engage the teeth on said ring to lock it, and said locking plate being turnable end for end to adjust said ring within a distance equal to one half of the distance between its teeth.

3. The combination with a tractor having a vertically disposed hollow spindle, a gear box formed integral with and disposed at the top of said spindle and having an opening in one of its side walls, a collar formed in the inside face of said spindle at the junction of said box and spindle, a bearing supporting ring in said collar, a bearing eccentrically mounted in said ring, a shaft disposed in said spindle and projecting through said bearing into said gear box, of means including teeth on said ring for rotating it to cause said eccentric mounting of the bearing to move the end of the shaft disposed in the gear box laterally to that box, a locking plate having two bolt holes and a pawl projecting from the plate and offset from the half-way point between said bolt holes a distance equal to one-half the distance between adjacent teeth on said ring, said pawl being projected through the opening in said gear box side wall to engage the teeth on said ring to lock it, and said locking plate being turnable end for end to adjust said ring within a distance equal to one-half of the distance between its teeth.

In witness whereof, I hereunto subscribe my name this 24th day of May, 1929.

JOHN T. LIGGETT.